United States Patent [19]

Iizuka et al.

[11] Patent Number: 5,198,942

[45] Date of Patent: Mar. 30, 1993

[54] DISC DRIVE CONTROL DEVICE WITH ACCESSING AND POWER CONTROL

[75] Inventors: Hajime Iizuka, Tatebayashi; Zenjiro Uchida, Ashikaga, both of Japan

[73] Assignee: Sanyo Electric Co., Ltd., Moriguchi, Japan

[21] Appl. No.: 520,085

[22] Filed: May 7, 1990

[30] Foreign Application Priority Data

May 9, 1989 [JP] Japan .................................. 1-115603

[51] Int. Cl.[5] .......................... G11B 5/596; G11B 5/54
[52] U.S. Cl. .................... 360/78.04; 360/105
[58] Field of Search ............... 360/78.01, 69, 75, 103, 360/105, 78.04

[56] References Cited

U.S. PATENT DOCUMENTS

| | | | |
|---|---|---|---|
| 4,727,443 | 2/1988 | Miyake et al. | 360/75 |
| 4,751,595 | 6/1988 | Kishi et al. | 360/105 |
| 4,758,914 | 7/1988 | Ishii | 360/75 |
| 4,786,995 | 11/1988 | Stupeck et al. | 360/75 |

FOREIGN PATENT DOCUMENTS 0224378 11/1986 European Pat. Off. .
8602480 4/1986 PCT Int'l Appl. .

OTHER PUBLICATIONS

"Retract System in Disk System", vol. 10, No. 19, (P-423) [2076] Jan. 24, 1986–Patent Abstracts of Japan.

*Primary Examiner*—Wayne R. Young
*Assistant Examiner*—Won Tae C. Kim
*Attorney, Agent, or Firm*—Morrison Law Firm

[57] ABSTRACT

A disc drive control device maintains power to its circuits after a manual power source switch is opened for a time sufficient to assure that the read/write head of a hard disc drive is moved to its shipping zone. This is accomplished with a bypass device for maintaining power to the hard disc drive until the head is properly stowed in its shipping position after the operator turns off the power switch. Further, a detecting circuit prevents the disc drive from hanging up when the operator turns power on again before the head movement is completed. A timer turns off the power bypass device a short time after the power source switch is turned off, if, for any reason, the power bypass fails to be shut down as a normal result of the completed movement of the read/write head to the shipping position.

2 Claims, 3 Drawing Sheets

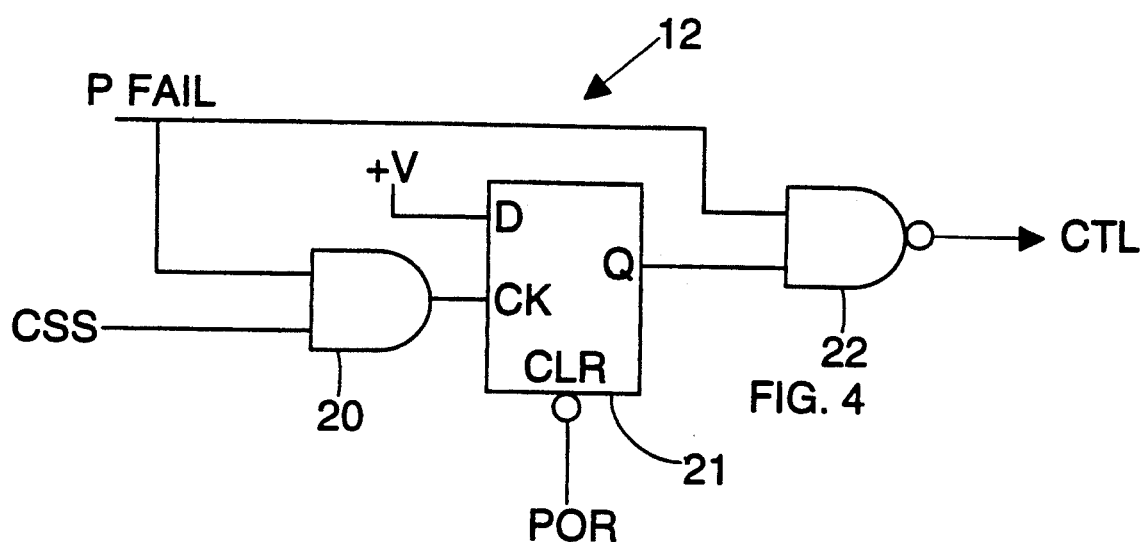

DISC DRIVE CONTROL DEVICE WITH ACCESSING AND POWER CONTROL

BACKGROUND OF THE INVENTION

This invention relates to a disc drive control device for controlling a disc drive unit such as a hard disc or the like, and particularly a control device suitable for a portable information processing device such as a lap top computer.

Lap top computers conventionally employ external memory devices such as, for example, floppy disc. More recently, hard disc drives have appeared in such computers to give greater storage.

Such a hard disc drive is generally provided with a built in disc controller which, when it receives a disc access demand from a host, controls positioning of the read/write head on the disc and the reading-out or writing-to a medium.

According to the prior art, upon completion of reading or writing in the data area of the hard disc, the head remains positioned over the cylinder where the reading or writing was done. When the host demands a further access, the head is moved to the cylinder containing the desired data, or to which data is to be written.

While the power source remains connected to the hard disc, the head is maintained out of contact with the hard disc due to rotation of the hard disc. When the power supply is cut off, rotation of the hard disc ceases, and the head comes into contact with the data area or the hard disc. Shaking of vibration occurring while the head is in contact the data area may injure the recording medium, thereby causing loss of data.

The problem is particularly severe in the case of a lap top computer, wherein the importance of mobility greatly increases the risk of damaging recorded data.

OBJECTS AND SUMMARY OF THE INVENTION

Accordingly, it is an object of the invention to provide a disc control device which overcomes the drawbacks of the prior art.

It is a further object of the invention to provide a control device that assures that the read/write head of the hard disc drive unit is properly moved to the shipping zone, which is a non-data area at the inner periphery of the hard disc, whenever power to the unit is turned off.

It is a still further object of the invention to provide a control device that permits the resumption of operation if power is turned on again before the read/write head is returned to the shipping zone.

Briefly stated, the present invention provides a disc drive control device that prevents power from being interrupted to a read/write head controller before that controller has properly moved the head to its safe shipping position at a non-data area existing at the inner periphery of its associated hard disc. Therefore, when the operator turns off power, the read/write head is safely moved to its shipping position before power to the disc drive unit is interrupted. This is accomplished by an electronic switch that is placed electrically in parallel with an operator controlled power on/off switch. This electronic switch maintains power to the hard disc drive so that when the operator turns off the personal or lap top computer, the electronic switch bypasses the power source switch until the hard disc drive signals a control circuit within the disc control device that the read/write head movement to its shipping position has been completed. To support this operation, the device is provided with a latch that detects when the operator turns off the power source switch and generates an inhibit signal that prevents the hard disc drive from writing to the hard disc and initiates the movement of the read/write head to its shipping position. The latch also enables the control circuit to turn off the electronic switch when the read/write head is properly stowed. In addition, a timer is provided that turns off the electronic switch fifteen seconds after the operator turns off the power source switch in the event that the control device fails for any reason to do so.

The disc drive control device is also provided with a power detecting circuit and a counter that avoids hanging up if the power source switch is turned on before the completion of head movement.

Briefly stated, the present invention provides a disc drive control device that maintains power to its circuits after a manual power source switch is opened for a time sufficient to assure that the read/write head of a hard disc drive is moved to its shipping zone. This is accomplished with a bypass means for maintaining power to the hard disc drive until the head is properly stowed in its shipping position, located at an inner periphery of the disc, even if the operator turns off the power switch while the hard disc drive is operating. Further, means are provided to prevent the disc drive from hanging up when the operator turns power on again before the head movement is completed. A timer turns off the power bypass means a short time after the power source switch is turned off, if, for any reason, the power bypass fails to be shut down as a normal result of the completed movement of the read/write head to the shipping position.

According to an embodiment of the invention, there is provided a disc drive control device comprising: a hard disc drive unit, a power source switch for applying power to the hard disc drive unit, means for moving a head of the hard disc drive unit to a non-data area of a hard disc, and means for maintaining power to the hard disc drive unit after the power source switch is opened for a time sufficient to permit completion of a head movement to the non-data area.

According to a feature of the invention, there is provided a disc drive control device comprising: a hard disc drive unit, a power source switch effective for applying power to the disc control device, an electronic switch bypassing the power source switch, a logic device normally providing an access enable signal to the hard disc drive unit when the power source switch is closed, the logic device providing an access inhibit signal to the hard disc drive unit when the power source switch is opened, means for moving a head of the hard disc drive unit to a non-data area, the hard disc drive unit providing a move termination signal upon completion of a move of the head to the non-data area, a control circuit including means for producing a control signal in the simultaneous presence of the access inhibit signal and the move termination signal, and means for permitting the electronic switch to continue bypassing the power source switch after the power source switch is opened until the control signal is generated, whereby power is maintained to the hard disc drive unit until head movement is completed.

The above, and other objects features and advantages of the present invention will become apparent from the following description read in conjunction with the accompanying drawings, in which like reference numerals designate the same elements.

BRIEF DESCRIPTION OF THE DRAWINGS

FIGS. 2a-2e are timing charts to which reference will be made in explaining the operation of the disc control device of FIG. 1.

FIGS. 3a-3g. are further timing charts to which reference will be made in explaining the operation of the disc drive control device of FIG. 1.

FIG. 4 is a block schematic of the control circuit 12 of FIG. 1.

DETAILED DESCRIPTION OF THE PREFERRED EMBODIMENT

In the following description, a binary 1 signal is identified as an "H" signal, and a binary 0 is identified as a "L" signal.

Figure 1:
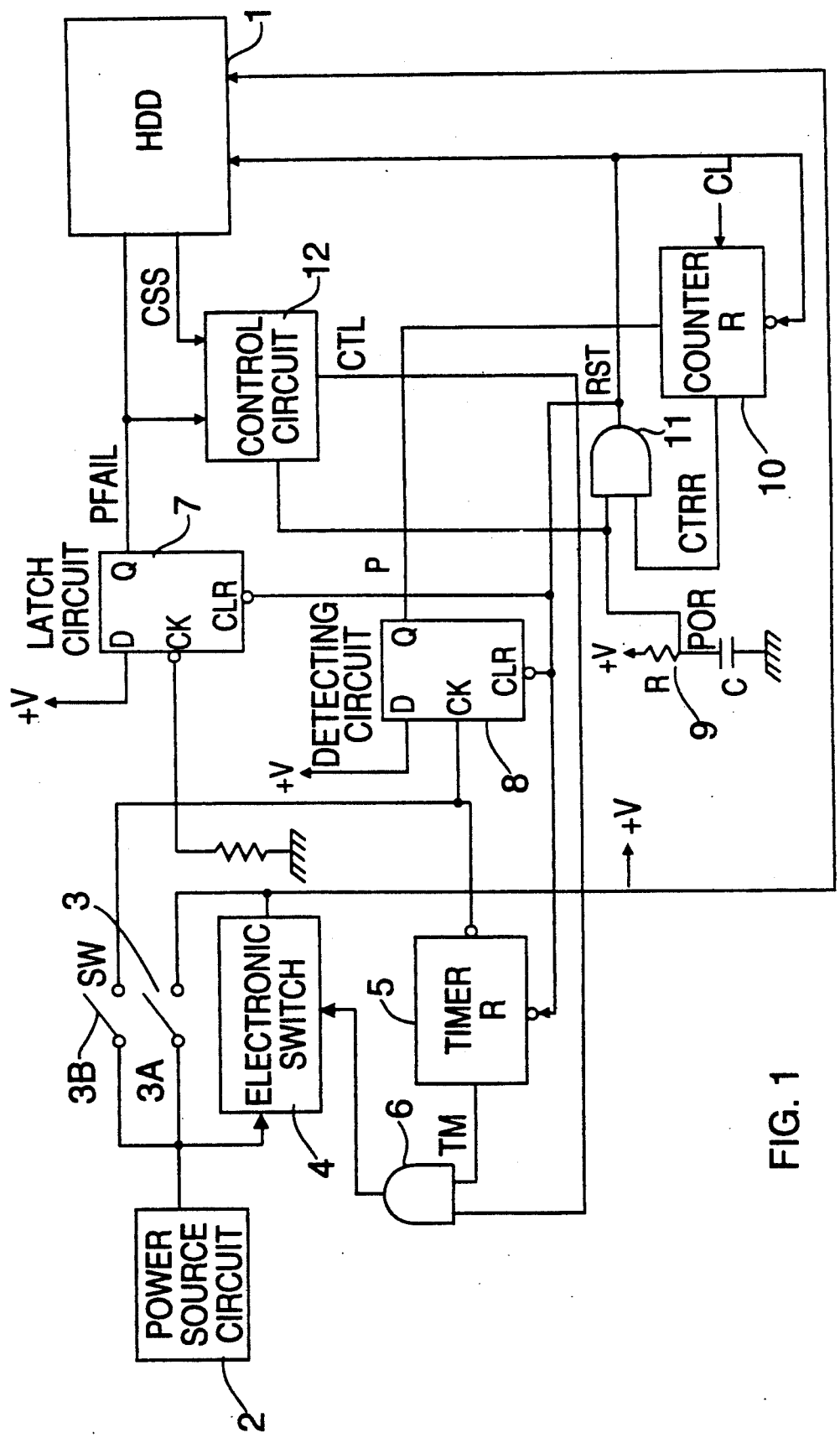
FIG. 1 is a block diagram of a disc drive control device according to an embodiment of the invention.

Referring to FIG. 1, a power source circuit 2, which may be, for example, a battery, applies power to two ganged sections 3a and 3b of a power source switch 3, and to an input of an electronic switch 4. Electronic switch 4 is connected in parallel with section 3a of power source switch 3. Section 3a also applies power +V to all circuits in the device.

Section 3b of power source switch 3 applies power to an inverting input of a latch circuit 7, to a direct input of a detecting circuit 8 and to an inverting input of a timer 5. A pull-down resistor is connected between these inputs and ground. Latch circuit 7 and detecting circuit 8 are D-type flip flops, each receiving the voltage +V at its data input.

A direct output Q of latch circuit 7 produces a "L" access allowance signal PFAIL for application to an input of hard disc drive unit 1, and to an input of a control circuit 12. Upon completion of head parking, hard disc drive unit 1 applies a move termination signal CSS to an input of control circuit 12.

A signal P is connected from the direct output Q of detecting circuit 8 to an input of a counter 10. Counter 10 receives a clock signal CL from a source that is not shown, but which is conventionally available in a computer, at one of its inputs.

A power-on-reset circuit 9 includes a resistor R in series with a capacitor C between the voltage +V and ground. A power-on-reset signal POR from the junction of resistor R and Capacitor C to an input of an AND gate 11. The power-on-reset signal POR is also connected to an input of control circuit 12. An output CTRR of counter 10 is applied to the second input of AND gate 11. A reset signal RST is connected from the output of AND gate 11 to a reset input R of counter 10, an input of hard disc drive unit 1, clear inputs CLR of latch circuit 7 and detecting circuit 8, and to the reset input R of timer 5.

A control output CTL of control circuit 12 is connected to an input of an AND gate 6. An output TM of timer 5 is connected to the second input of AND gate 6. The output of AND gate 6 is connected to a control input of electronic switch 4.

Referring now to FIG. 4, control circuit 12 includes an AND gate 20 receiving the access allowance signal PFAIL at one of its inputs and the move termination signal at the other of its inputs. The output of AND gate 20 is connected to the clock input CK of a D-type flip flop 21. The voltage +V is connected to the data input of flip flop 21. The power-on-reset signal POR is connected to an inverted clear input CLR of flip flop 21. The access allowance signal PFAIL is also connected to one input of a NAND gate 22. The direct output Q of flip flop 21 is connected to the other input of NAND gate 22. The output of NAND gate 22 is the control signal CTL.

The power-on-reset signal POR is at the "L" level only following initial turn-on. Although the signal SW is interrupted by turning off power source switch, as shown in FIG. 3a, the power +V remains continuously supplied by electronic switch 4, until electronic switch 4 is turned off. Accordingly, after initial turn-on, flip flop 21 is reset by the power-on-reset signal POR, thereby producing a control signal CTL at the "H" level.

Figure 5:
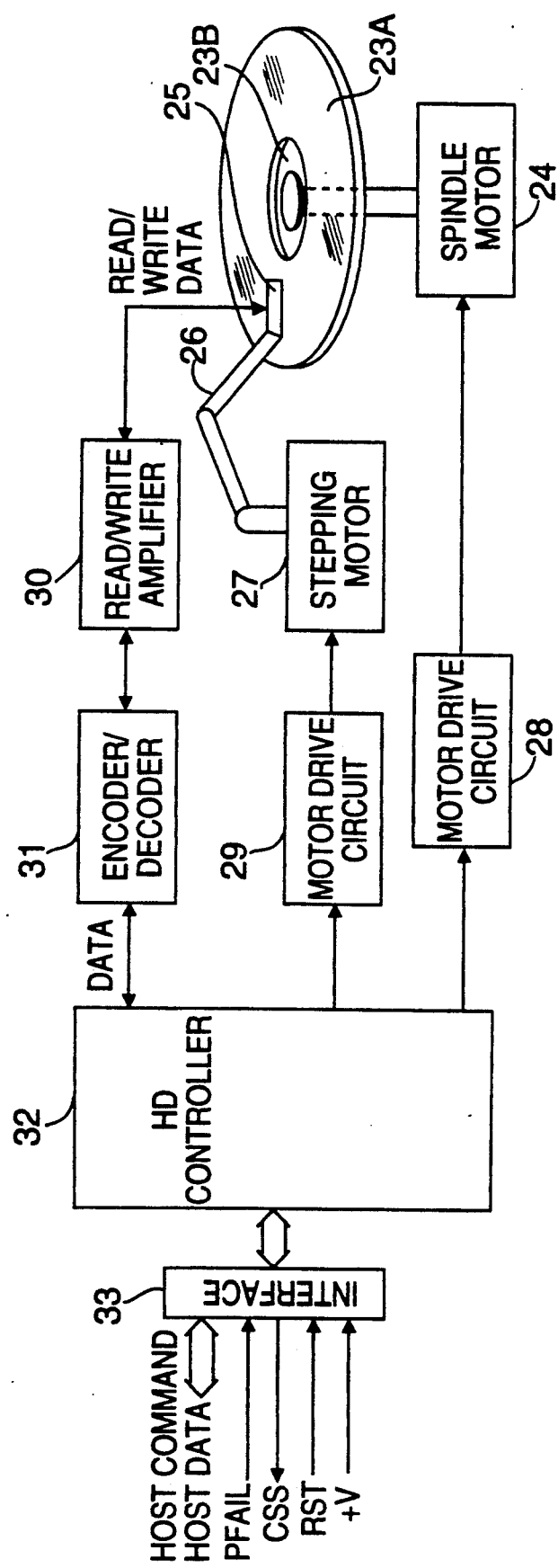
FIG. 5 is a block diagram of the HDD 1 of FIG. 1.

Referring now to FIG. 5, data and command signals are connected to the hard disc drive 1 through the interface circuit 33 which conditions these input signals for use by the hard drive. These signals are transferred to a hard drive controller 32 over a data bus. The data signals are transferred to and from the read/write head 25 of the hard drive by bidirectional circuits of encoder/decoder 31 and read/write amplifier 30. In addition, drive signals from the interface circuit are connected to motor drive circuit 28, which powers spindle motor 24 to rotate the hard disc 23 continuously until it is turned off. While hard disc 23 is rotating, the head and disc are in a non-contact condition. At the same time, read/write head positioning signals from the host are decoded by motor drive circuit 29, which positions the read/write head 25 by controlling stepping motor 27. The hard disc 23 is divided into two major zones, a larger outer data area 23a for the storage of data and a smaller inner shipping zone 23b.

As long as the access allowance signal PFAIL remains in the "L" condition, disc access is permitted. Whenever the access allowance signal is in the "H" condition, disc access is denied. When the access allowance signal makes a transition from "L" to "H", stepping motor 27 is driven to move the head to the shipping zone. Once the move to the shipping zone is completed, the move termination signal CSS is output to enable the removal of power from the system.

In addition to the power-off operation described above, stepping motor 27 is driven by hard disc controller 32 to move the read/write head 25 to positions over the hard disc as commanded by the host.

In operation, when power is initially turned on, the slow rise in the output of power-on-reset circuit 9 (FIG. 2b) maintains the reset signal RST at the "L" level for some time after power is applied. As a consequence, the direct outputs Q of latch circuit 7 and detecting circuit 8 remain at the "L" level. The effective level for the access allowance signal PFAIL is the "L" level. Consequently, disc access in hard disc drive 1 is enabled by the "L" level existing after initial turn-on of power source switch 3.

Returning momentarily to FIG. 4, the output of AND gate 22 is at the "H" level until both of its inputs are at the "H" level. That is, both the access enable signal PFAIL and the direct output Q of flip flop 21 must change to the "H" level before the output of AND gate 22 can change to the "L" level. In order for the direct output Q of flip flop 21 to change to the "H" level, both access enable signal PFAIL and the move termination signals must be at the "H" level. This only occurs after power is interrupted by opening power source switch 3, and the movement of the head to the parking zone is completed.

The output TM of timer 5 is normally "H". When the control signal CTL becomes "H", the output of AND gate 6 also becomes "H". This "H" level, connected to the gate input of electronic switch 4, closes electronic switch 4 in parallel with section 3a of power source switch 3.

Referring to the waveforms in FIGS. 2a-2e, when power source switch 3 is opened, the signal SW connected to the inverting clock input CK of latch circuit 7 falls to the "L" level (FIG. 2a). This is the enable level for latch circuit 7. As a consequence, the direct output Q of latch circuit (the PFAIL signal) 7 changes from the "L" level to the "H" level (FIG. 2c). This initiates the parking motion of the head of hard disc drive unit 1.

Electronic switch 4, which may be, for example, a field effect transistor, maintains power +V to the remaining circuits as long as an "H" signal remains applied to its control input from AND gate 6.

When head movement is completed after, for example, about 4 seconds, the move termination signal CSS changes from "L" to "H" (FIG. 2d). This provides the final condition for triggering control circuit 12. That is, PFAIL and CSS are both at the "H" level. As a consequence the control signal CTL changes to the "L" level.

The "L" level on the control signal CTL inhibits one input of AND gate 6. The "H" level signal previously supplied from AND gate 6 to electronic switch 4 changes to the "L" level. As a consequence, electronic switch goes into the non-conducting state, thereby removing power +V from the remainder of the circuits. Power is thus cut off.

Once power +V is cut off, capacitor C in power-on-reset circuit 9 begins discharging (FIG. 2b). As soon as the level of the POR signal falls below the logic level required by AND gate 11, the reset signal RST changes from "H" to "L". This resets all circuits to which the reset signal RST is connected.

Timer 5 is a backup device to ensure that power is turned off after power source switch 3 is opened, even if, for any reason, the control signal CTL fails to go to the "L" level following switch turnoff. The negative going edge of the signal SW from section 3b of power source switch 3 triggers timer 5 into beginning a 15 second timing period. During normal powered operation, and during the 15 second timing period, timer 5 maintains an "H" level signal TM on an input of AND gate 6. At the end of the 15 second period, the signal TM changes to the "L" level. This removes the enable signal from electronic switch 4, thereby removing power +V from all circuits.

It is desired to maintain power to the system if power source switch 3 is again closed before head parking is completed. When power source switch 3 is again closed before the read/write head returns to the shipping zone, that is, before the move termination signal CSS is generated, the access allowance signal PFAIL remains in the "H" condition. If nothing were done to prevent this condition, access to the hard disc drive would be prohibited, thus hanging up the system. Hanging up is prevented by operation of detecting circuit 8, together with counter 10 and AND gate 11.

Referring now to FIGS. 3a-3g, if power source switch 3 is opened, then closed again during the period of up to four seconds before the arrival of the move termination signal CSS at control circuit 12 (FIG. 3a), the positive-going leading edge of the power signal SW FIG. 3a, fed to the non-inverting clock input CK of detecting circuit 8 triggers detecting circuit 8 into the set condition, whereby the signal P from the direct input Q thereof change to the "H" level (FIG. 3f). This signal, applied to an input of counter 10, immediately changes the normal "H" level output CTRR of counter 10 to the "L" level and enables counter 10 to begin counting a predetermined number of clock pulses CL. Once the predetermined number of pulses have been counted, the output CTRR of counter 10 returns to the "H" level (FIG. 3g). The number of clock pulses CL counted by counter 10 determines the width of the output pulse CTRR. Nominally, the output pulse CTRR is about 150 microseconds, but this value may be changed for different types of circuit components. This "L" signal CTRR, applied to the input of AND gate 11 produces a negative reset signal RST for resetting latch circuit 7, detecting circuit 8, timer 5 and counter 10. This restores normal operation, with the PFAIL and P signals both restored to the normal "L" level. Hard disc drive unit 1 resumes access to the hard disc, as though no power interruption had occurred.

According to a remarkable aspect of this invention, even though the power source switch 3 is turned off, the head is moved to its shipping zone before the power source to the hard disc derive is interrupted, so that the medium and data are completely protected from loss or damage.

According to another aspect of this invention, even though the power source is again turned on prior to power interruption to hard disc drive unit 1 after turning off power source switch 3, the system does not hang up.

According to a further aspect of this invention, even though the move termination signal CSS is not supplied for some reason when power source switch 3 is turned off, the power source is interrupted by the output of timer 5, thereby avoiding the worst event in a battery-operated device, that the power supply cannot be cut off.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A disc drive control device comprising:
   a hard disc drive unit;
   a power source switch effective for applying external power to said disc drive control device;
   an electronic switch bypassing said power source switch;
   a first logic device normally providing an access enable signal to said hard disc drive unit when said power source switch is closed;
   said first logic device providing an access inhibit signal to said hard disc drive unit when said power source switch is opened;
   means for moving a head of said hard disc drive unit to a non-data area;
   said hard disc drive unit providing a move termination signal upon completion of a move of said head to said non-data area;

a control circuit including means for producing a control signal in the simultaneous presence of said access inhibit signal and said move termination signal;

means for permitting said electronic switch to continue bypassing said power source switch after said power source switch is opened until said control signal is generated, whereby power is maintained to said hard disc derive unit until head movement is completed;

means for permitting resumption of operation without cutting off power to said hard disc drive unit if said power source switch is closed before the completion of said head movement;

said means for permitting resumption includes a second logic device;

said second logic device including means for producing a reset signal upon the closing of said power source switch before the completion of said head movement; and said reset signal being applied to reset said first logic device, whereby said access enable signal is again produced.

2. Apparatus according to claim 1, further comprising:

a power-on-reset circuit;

said power-on-reset circuit including a delay circuit; and said delay circuit being effective for producing a reset signal for application to the said first logic device and said second logic device when power is initially applied to said hard disc drive unit, whereby initial conditions for operation are provided.

* * * * *